D. CONLAN, Jr.
JUNCTION, WALL, FLOOR, OR OTHER BOX.
APPLICATION FILED AUG. 3, 1907.
936,705.
Patented Oct. 12, 1909.
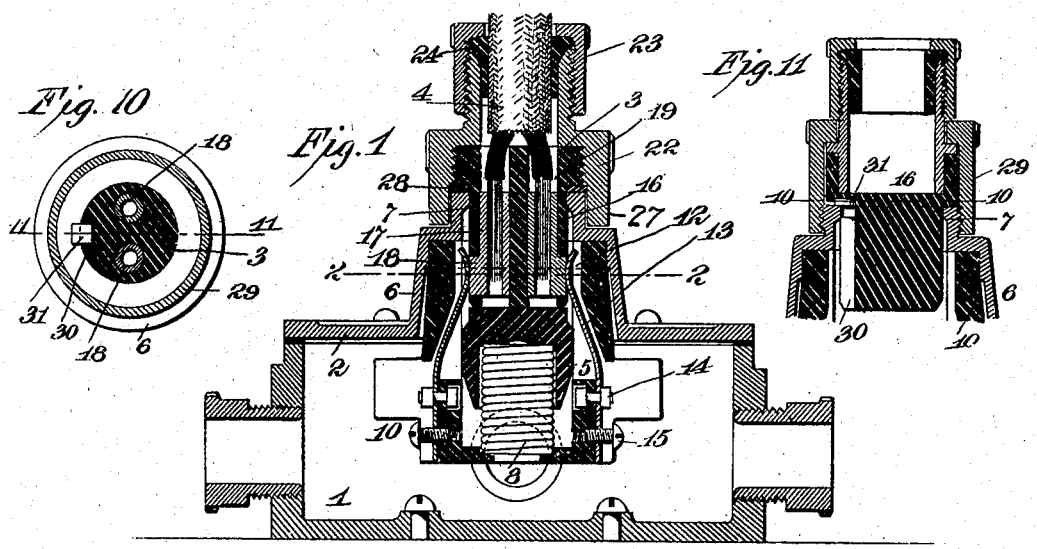
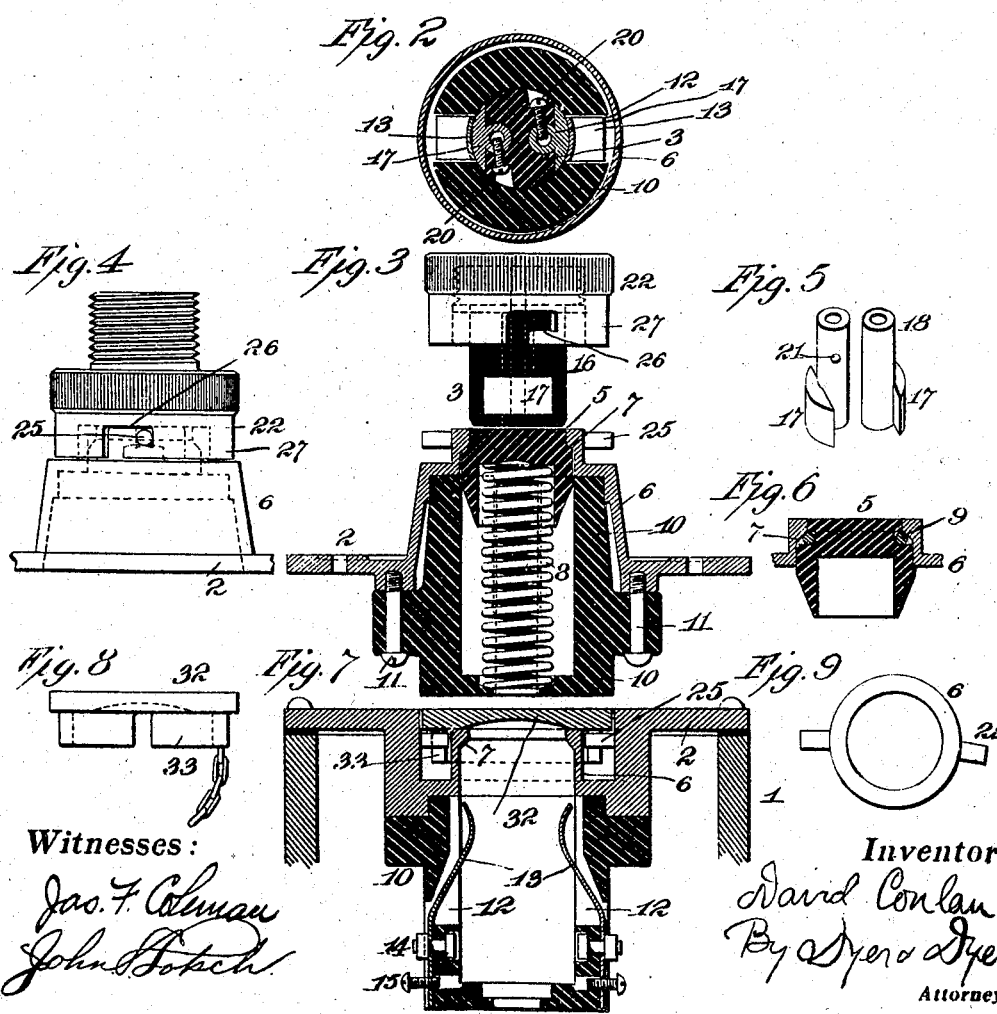
Witnesses:
Jas. F. Coleman
John Potsch
Inventor
David Conlan Jr
By Dyer & Dyer
Attorneys.

UNITED STATES PATENT OFFICE.

DAVID CONLAN, JR., OF NEW YORK, N. Y., ASSIGNOR TO ELIZABETH CONLAN, OF BROOKLYN, NEW YORK.

JUNCTION, WALL, FLOOR, OR OTHER BOX.

936,705.   Specification of Letters Patent.   Patented Oct. 12, 1909.

Application filed August 3, 1907. Serial No. 386,868.

*To all whom it may concern:*

Be it known that I, DAVID CONLAN, Jr., a citizen of the United States, residing in the borough of Manhattan, city, county, and State of New York, have invented a certain new and useful Junction, Wall, Floor, or other Box, of which the following is a specification.

The object I have in view is the production of a device which may be used in connection with a box, such box being a junction box, a floor box, or a wall box for a flexible connection or for a lamp fixture, or for other purposes which will primarily be water tight under all circumstances, with the plug in place or removed.

I further seek to avoid the necessity of applying a cover to the box when the plug is removed but make the opening disclosed by the removal of the plug automatically close to prevent the entrance of water into the box and system.

A further object is to produce a box in which the connections with the mains or branches can be readily made, the connections for the terminals being made on the cover and not within the box as has heretofore been the case.

A further object consists in improving the connection of the terminals with the plug resulting in an easy adjustment, reducing the danger of short-circuiting, avoiding the connection of the wires to binding screws and requiring no soldering of the strands of the wires at the binding post.

Still another object is to produce a device in which sparking will be prevented when the plug is withdrawn from the box.

Further objects will appear in the following specification and accompanying drawings taken together or separately.

I attain the objects of my invention by the mechanism illustrated in the accompanying drawing, in which—

Figure 1 is a longitudinal section of a junction box embodying my improvement. Fig. 2 is a cross section on the line 2—2 of Fig. 1. Fig. 3 is a longitudinal section at right angles to Fig. 1 of a portion of the junction box with the plug removed therefrom, and shown in elevation the contact springs being shown in dotted lines. Fig. 4 is a side elevation of a portion of the device. Fig. 5 is a detail section of the binding posts for the terminals and contacts for the springs. Fig. 6 is a detail view of a modified form of valve. Fig. 7 is a sectional view of a floor box embodying my invention. Fig. 8 is a detail view of a cap for the floor box. Fig. 9 is a top view of a modified form of lock for use with alternating currents or battery charging. Figs. 10 and 11 are detail views showing a modified form of plug.

In all the views like parts are designated by the same reference characters.

In the drawings, 1 is the box, and 2 the cover.

The plug 3 and the connections for the mains and branches are all carried by the cover so that the splicing together of the mains and branches can be made within the box with the cover removed, the interior of the box being entirely unobstructed. A much easier and better connection can be made within the unobstructed box than has heretofore been possible with boxes in which the contact devices are carried on the bottom of the box.

The plug 3, which is permanently connected to the branch 4, is adapted to be introduced into an opening in the cover and locked in position. This opening, when the plug is removed, is closed by a valve 5. The introduction of the plug opens the valve, electric connection being then automatically made within the box.

In one embodiment of my invention I provide the cover 2 with a hollow, circular standard 6, the upper extremity being open, forming an aperture of circular cross section which is closed by the valve 5.

The inner faces of the opening in the top of the standard are beveled at 7, against which the beveled face of the valve will engage, thus forming a seat. The valve is forced against this seat by a spring 8. The valve is best made of insulating material such as hard rubber, and is best made of the shape shown in the drawing, there being a recess in the bottom, and the lower edge being beveled, the spring 8 lying within the recess.

In Fig. 6 a modification is shown in which a ring 9 of soft rubber or other suitable material is provided, forming a gasket, which bears against the seat 7.

The valve lies within a center recess in a block 10, the spring 8 bearing against the lower end of the recess. The block 10 is shown as provided with lugs through which pass screws 11 for securing the block to the underside of the cover 2. A portion of the block lies within the hollow standard 6, the rest of the block depending within the box 1. The sides of the block are provided with recesses 12 extending entirely through the walls of the block to the center opening. Within these recesses lie the contact springs 13. These springs are secured at their lower ends to the block by bolts 14, and also have binding screws 15 for connection with the mains or branches which come into the box. The upper ends of the springs 13 are bent inward so that they will engage with the plug 3 when the latter is introduced into the box. The extreme free ends of the springs are bent outward, as shown, so that when the plug is introduced and engages with the springs, the latter will be separated so as to elastically engage with the plug and make electrical contact therewith.

When the valve is in closed position, the spring contacts 13 will engage with its beveled lower edge, thus assisting in closing the valve and retaining it in position, should the spring 8 break. Should also the spring 8 break while the valve is open or closed, the walls of the recess, within which the spring lies, will keep the spring from coming in contact with either of the spring contacts 13, or otherwise being short circuited. Should either or both of the spring contacts 13 break, they will remain insulated from the uninsulated portions of the box, by engagement with the valve.

The plug has a body 16 of insulating material, within which lie the contact plates 17 and binding posts 18. The binding posts 18 are shown as in the form of tubes of conducting material, and the contact plates 17 are best of the shape shown. They may be separate from or integral with the binding posts, but in either case they are electrically connected together.

The body 16 may be made of hard rubber molded around the contact plates and binding posts. The relative positions of the latter are shown in Fig. 5. The tops of the binding posts do not extend quite to the top of the body 16, an opening 19 communicating with the upper edge of the body and the top of each binding post. The openings 19 are each sufficiently large to admit one of the strands of the branch 4, complete with its insulating covering. The branch 4 extends in its complete state down to the top of the body 16 and each separate strand with its insulating covering extends from the top of the body down to the top of the binding post 18, or nearly thereto, the insulation lying within the openings 19. The uncovered wires extend into the openings in the binding posts, such openings being of a size to take the uncovered strands. These strands are secured in position and forced into electrical contact with the walls of the binding posts by the screws 20. Each of these screws 20 passes through an opening in a binding post above the contact plate 17. The location of one of such screw holes is shown in Fig. 5 at 21. The advantage of this construction is that the covered wires, when separated from the rest of the insulation, enter the openings 19 and extend some distance therein covered with insulation. The spark gap is much larger than the prior structures, in which the bare wire extends up to the undiminished cable, the intermediate covered wires not being present. By incasing the wires in the binding posts 18 instead of securing them by the usual screws the full size of the wires is retained, and the strands do not have to be soldered together as is usual. As shown in Fig. 2, the binding screws 20 for the two binding posts come into the body on opposite sides. If more than two binding posts are used for each plug, the location and arrangement of the screws will be modified accordingly.

In addition to the body 16, the plug comprises a metallic casing 22. This casing is shown as connected to the body 16 by screw threads, but such particular means of connection is not essential, and is chosen only for illustration. The upper portion of the casing is reduced in diameter and is provided with a gland 23. This gland holds in position a rubber plunger 24, which closely surrounds the branch 4. By means of the gland and rubber plunger a stuffing box is produced which absolutely prevents the ingress of water or moisture into the plug.

The plug is held in position upon and within the standard 6, with the contact plates 17 in engagement with the springs 13 by means which permit its ready removal; one means is a bayonet joint. This bayonet joint is made by the pins or trunnions 25, on the standard 6, which pins engage with L-shaped slots 26, formed in a skirt 27 on the casing 22. This skirt 27 surrounds and incloses the upper reduced extremity of the standard 6. The pins or trunnions 25 may be arranged one opposite to the other, as is shown in Fig. 4, in which figure, one of the slots 26 is shown in dotted lines. If it is necessary to insure the introduction of the plug without reversing, as is necessary to preserve polarity in alternating currents or where used for battery charging or other purposes the trunnions may be arranged as in Fig. 9, where they are not in line. The slots being properly formed to engage with the trunnions, shown in Fig. 9, the plug must always be introduced in the same way so that the connections cannot be accidentally reversed.

The body 16 of the plug is introduced within the hollow standard 6 and enters the center opening in the block 10. The introduction of the plug pushes the valve 5 from the position it normally occupies, closing the opening in the cover, to a position substantially like that shown in Fig. 1, compressing the spring 8. The slots 26 are caused to engage with the trunnions, and when the plug is completely seated it is given a partial turn. A portion of the casing 22 may be milled, as shown, to facilitate the turning of the plug. By giving the plug the necessary partial turn in the opposite direction it may be drawn out, the valve 5 following and automatically seating to close the opening in the cover. The spring 8 should be of sufficient power not only to make a perfectly water tight joint around the valve, but to throw the plug outward and make a quick break of the contact springs 13 and the contact plates 17.

For the purpose of preventing accidental rotation of the plug, the lower surface of the branch of each of the slots 26, where it engages with the trunnion, is curved as shown, so that a cam action may be produced and the tension of the spring 8 will tend to hold the plug against rotation.

For the purpose of preventing leakage of water or moisture while the plug is in place within the box, an elastic washer 28 may be provided between the plug and the standard 6. This washer is best placed where shown, lying within the skirt 27, and forced against the upper edge of the standard 6 by a flange formed on the body 16.

A modified form of plug is shown in Figs. 10 and 11. In this form of plug the part analogous to the skirt 27 is in the form of a separate ring 29, which may be rotated independently of the rest of the plug. This ring is provided with internal screw threads, as shown on Fig. 11, which engage with corresponding threads formed in the reduced extremity of the standard 6. The body 16 of the plug is introduced by a rectilinear movement, and when the plug is completely seated it is secured in position by the engagement of the threads on the ring 29 with the threads on the standard 6 by rotating the ring. To insure the proper engagement of the contact springs 13 with the contact plates 17, the body 16 is shown as provided with a longitudinal slot 30 which engages with a finger 31 carried by the standard. The relative position of the slot and finger may be reversed, as is obvious. This form of plug has the same advantage as the construction shown in Fig. 9, in that the contacts cannot be reversed.

The application of the invention to a floor box is shown in Fig. 7. In that view the valve and its seating spring are not present but they may be made identically the same shape as described in connection with the other embodiments of the invention. The standard 6 at its upper edge is depressed below the top of the cover 2 of the box so that when the plug is removed a shallow recess will be formed. Within this recess may be placed a cap 32, shown in Fig. 8, which will form a surface flush with the floor. This cap may be attached to the box by a chain so that it may not be misplaced. When in place it is adapted to rest upon the upper edge of the standard 6. The cap may have a flange 33, which will extend down outside of the standard 6. Notches may be formed in the flange so as to fit over the trunnions 25. The cap may be removed by depressing one edge of the cap and raising the opposite edge so that it may be grasped by the fingers. In this modification the trunnions 25 are carried directly by the cover 2 and not by the standard 6. By means of the cap the box may be stepped upon without danger of opening the valve 5, and a perfectly flush surface with the floor or deck will be produced. A cap may be employed in connection with the other forms of plug illustrated, as is evident.

In the construction employing the bayonet connection between the plug and the box the contact plates 17 are sufficiently long to be in electrical engagement with the springs 13 during the lateral or twisting movement, which must necessarily be given to the plug to engage or disengage the trunnions 25 with the slot 26. The breaking of the contact is caused by the rectilinear movement of the plug. As already explained, the spring 8 should be sufficiently powerful to rapidly throw the plug out of the box. The power of the spring had best be such that this quick movement of the plug will be secured in spite of the fact that the plug is in the hands of the person making adjustment.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is—

1. A box having oppositely opposed spring contacts, a valve lying between said contacts and in engagement with them when the valve is closed, and a spring for closing the valve, in combination with a plug, carrying contacts, the said plug being so formed that, when introduced into the box, it will thereby open the valve, and make contact with the spring contacts, and when the plug is removed, the spring will close the valve which will separate and insulate the spring contacts.

2. A box having oppositely opposed spring contacts of opposite polarity, a valve lying between such contacts, the said valve having a recess, and a spring for closing the valve and extending into the recess, in combination with a plug, carrying contacts, the said plug being so formed that, when introduced into the box, it will thereby open the valve, and when the plug is removed, the spring will close the valve, and separate the spring contacts, the walls of the recess entirely separating the spring from the spring contacts when the valve is closed.

3. A terminal box having a valve and spring contacts, and a hollow block carrying the spring contacts, such contacts being insulated from the inner walls of the block, except at their free ends, where they come in contact with the valve when the latter is in closed position.

4. A terminal box having a valve and spring contacts, and a hollow block carrying the spring contacts in combination with a removable plug, carrying contacts, the spring contacts being insulated from the inner walls of the block, except at their free ends where they come into contact with the plug contacts when the plug is in position within the box.

5. A terminal box having a valve with a beveled lower end, and spring contacts, engaging with the valve, said spring contacts, when the valve is closed, engaging with the beveled portion thereof and tending to close the valve.

6. The combination with a box, of a removable plug, the said plug carrying a gasket which lies between it and the box and cam means for clamping the plug and box together and compressing the gasket.

7. The combination with a box, which carries a pin, of a plug and a gasket, there being a cam groove on the plug which engages with the pin, and compresses the gasket between the plug and box.

8. The combination with a box, having a pin, of a plug, with a skirt, the said skirt having an L-shaped slot, the circumferential limb of which has a curved side, such side engaging with the pin when the plug is in engagement with the box.

9. A box having a hollow block with openings therein, contact springs secured to the outside of the block and extending through the openings into the interior of the block, in combination with a removable plug carrying contact elements which engage with the springs when the plug lies within the block.

10. A box having a hollow block, the said block having a longitudinal opening in the side, a spring secured to the outside of the block and extending through the opening, in combination with a removable plug having a contact element which engages with the spring when the plug is in place, there being a valve within the block and a spring for closing the valve, the said valve being opened by engagement with the plug.

11. A box having a hollow block with longitudinal openings on the sides thereof, the said openings extending through less than the total length of the block. springs secured to the outside of the block and extending through such openings, each of said openings having a closed portion adjacent to the fixed ends of the springs, in combination with a valve, and a spring for closing the valve, the said valve when opened lying beyond the free ends of the first mentioned springs, and adjacent to the closed portions of the block.

This specification signed and witnessed this 25th day of July, 1907.

DAVID CONLAN, Jr.

Witnesses:
LEONARD H. DYER,
JOHN L. LOTSCH.